No. 636,691. Patented Nov. 7, 1899.
A. C. NYGAARD.
BICYCLE.
(Application filed May 24, 1899.)
(No Model.)
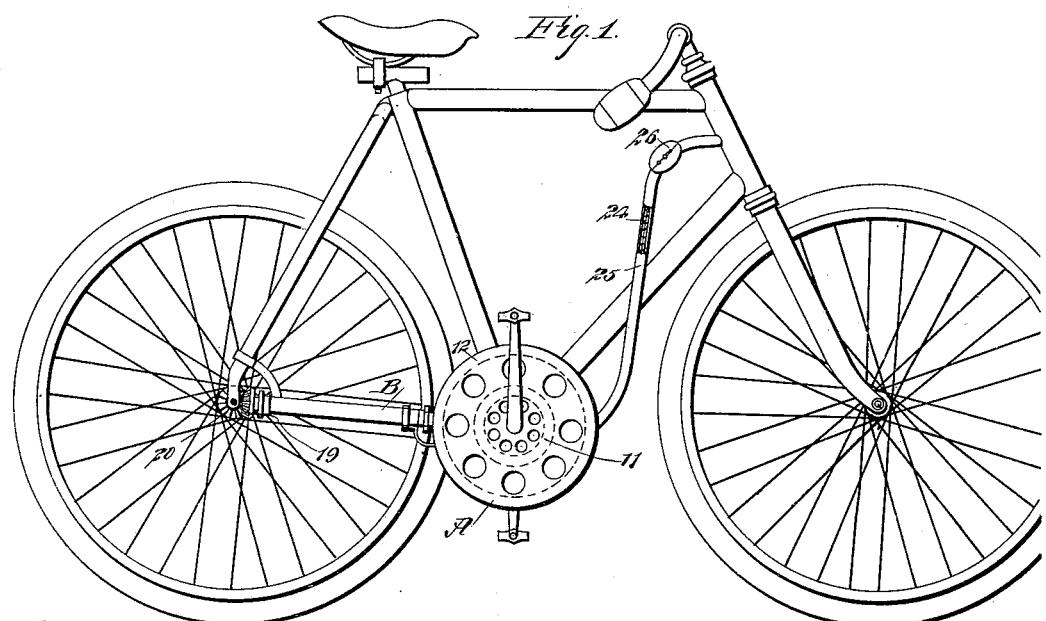
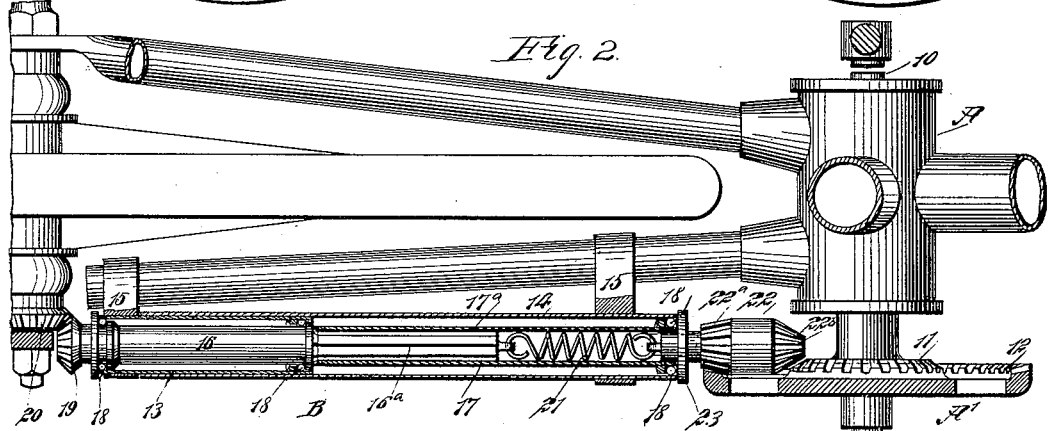
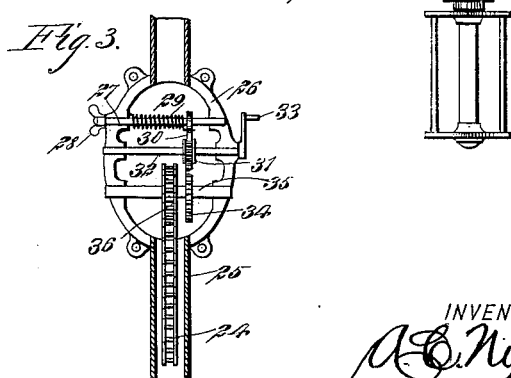
WITNESSES:
INVENTOR
BY
ATTORNEYS

UNITED STATES PATENT OFFICE.

ANDREW C. NYGAARD, OF RAWLINS, WYOMING.

BICYCLE.

SPECIFICATION forming part of Letters Patent No. 636,691, dated November 7, 1899.

Application filed May 24, 1899. Serial No. 718,039. (No model.)

*To all whom it may concern:*

Be it known that I, ANDREW C. NYGAARD, of Rawlins, in the county of Carbon and State of Wyoming, have invented a new and useful Improvement in Bicycles, of which the following is a full, clear, and exact description.

The object of my invention is to provide a chainless bicycle and to so construct the driving mechanism that a change may be made from high to low speed at the will of the rider and whereby, further, said change may be conveniently made, the means for effecting said change being adjacent to the handle-bars.

A further object of the invention is to provide a driving mechanism of the type above described that will be not only simple, but durable and economic, comprising but few parts and those not liable to disarrangement.

Another object of the invention is to provide a chainless driving mechanism for bicycles that may be applied to any form of machine.

The invention consists in the novel construction and combination of the several parts, as will be hereinafter fully set forth, and pointed out in the claims.

Reference is to be had to the accompanying drawings, forming a part of this specification, in which similar characters of reference indicate corresponding parts in all the figures.

Figure 1 is a side elevation of the bicycle having the improved driving mechanism applied. Fig. 2 is a horizontal section through the rear portion of the frame of the bicycle and through the driving mechanism applied thereto; and Fig. 3 is a vertical section through the casing in which the shifting mechanism is contained, said mechanism appearing in side elevation.

The crank-hanger A is provided with the usual crank-shaft 10; but a driving-wheel A' is secured upon the said crank-shaft between one of the pedal-arms and the crank-hanger, and this driving-wheel is provided with a hub-gear 11 upon its inner face and a peripheral gear 12 likewise produced upon its inner face, both of these gears being of the bevel type.

In the construction of the driving mechanism B a casing is employed constructed in two telescopic sections 13 and 14, both of said sections being secured to one of the members of the rear fork of the bicycle-frame, as is clearly shown in Fig. 2, by hangers 15 or their equivalents. A shaft 16 is mounted to revolve within the said casing, and said shaft is provided at its inner end with a polygonal section $16^a$. A tubular shaft 17 is made to telescope with the polygonal portion $16^a$ of the shaft 16, and that portion $17^a$ of the shaft 17 that thus engages with the shaft 16 is correspondingly shaped in cross-section to the cross-section of said polygonal portion $16^a$ of the shaft 16. These two shafts 16 and 17 are adapted to revolve, and to that end are mounted in suitable roller or ball bearings 18. A bevel-pinion 19 is secured to the outer end of the shaft 16, and said pinion meshes with a bevel-pinion 20, located on the axle of the rear wheel of the machine. A spring 21 is attached to the inner end of the polygonal portion $16^a$ of the shaft 16, and this spring is continued forward within the tubular shaft 17 and is secured to a stem to which a double gear 22 is attached, which gear is likewise securely fastened to the tubular section 17 of the shaft. This double gear is provided with a front bevel-section $22^b$, the teeth whereof are arranged for engagement with the hub-gear 11 and a rear bevel-section $22^a$, the teeth of which are adapted to engage with the peripheral gear 12 of the driving-wheel A', and when one section of the gear 22 is in mesh with the driving-wheel A' the other section is out of engagement therewith. When the inner section $22^b$ of the double gear 22 is made to engage with the hub-gear 11 of the driving-wheel, a slow speed is obtained, yet considerable power, which is very available in hill-climbing or in riding against the wind, and when the double gear is in mesh with the peripheral teeth 12 of the driving-wheel A' considerable speed may be attained.

It will be observed that the angle of the wheels $22^a$ and 12 is much smaller than that of the bevel-wheels 11 and $22^b$, so that said wheels $22^a$ and 12 form an approximation to angle-gear, in which one of the wheels has practically parallel teeth.

A collar 23 is secured to the stem of the double gear 22, and when the double gear is in mesh with the teeth 12 of the driving-wheel A' this collar is in engagement with the forward end of the section 14 of the casing. The section 14 of the casing is preferably made to slide in its hanger, and the change in speed is produced by drawing forward the said casing-section 14 and placing the spring 21 under tension, or permitting the spring 21 to restore the sections of the casing to their normal position, which is when the double gear is in mesh with the peripheral teeth 12 of the driving-wheel A'.

The section 14 of the casing may be shifted in various ways. Preferably this is accomplished by attaching one end of a chain 24 to the section 14 of the casing and carrying the chain upward through a tube 25, that is attached to the frame, which tube, near its upper end and convenient to the handle-bars, is provided with an enlarged chamber 26. (Shown best in Fig. 3.) A spindle 27 is mounted to turn in this chamber 26, being provided at its outer end with a thumb-screw 28, by which it may be manipulated, and a spring 29 is coiled around said spindle within the chamber, one end of the spring being attached to the chamber-wall and the other end having bearing against a pawl 30, the spring serving to normally hold the pawl in engagement with the teeth of a pinion 31, secured upon the shaft 32, journaled in said chamber and provided with a crank-arm 33 at one of its extremities. The pinion engages with a gear 34, secured upon a shaft 35, which shaft also carries a drum 36, to which the other end of the chain 24 is attached. The spring 29 continually exerts pressure upon the pawl 30, thus holding the pawl against the teeth of the pinion 31. By turning the thumb-screw 28 in proper direction the pawl 30 may be taken out of contact with the pinion 31, permitting said pinion to turn freely. When it is desired to proceed at a low rate of speed, the crank 33 is turned, thus winding up the chain 24 and drawing forward the double gear 22 and engaging the section $22^b$ with the hub-gear 11. When it is desired to travel at a high rate of speed, the pinion 31 is released from engagement with the pawl 30 and the section $22^a$ of the double gear 22 is permitted to engage with the larger toothed surface 12 of the driving-gear A'.

The shifting mechanism shown in Fig. 3 may be utilized as a brake mechanism, since by turning the crank 22 hard it will cause the teeth of the double gear 22 to press with force upon the driving-gear A', enabling the rider of the bicycle to travel down a steep hill in safety. The drum 36 is not absolutely needed, since the chain 24 or a substitute therefor may be wound directly upon the shaft 35.

Having thus described my invention, I claim as new and desire to secure by Letters Patent—

1. In a bicycle, the combination with the frame, a pinion on the axle of the rear wheel, and a driving-wheel on the pedal-shaft and having a hub-gear and a peripheral gear, of a telescoping casing carried by the frame, an extensible shaft mounted in the casing, said shaft consisting of a rear section having a polygonal inner end, and a tubular forward section fitting on the polygonal end of the rear section, a pinion on the rear end of the rear section of the shaft, a double-gear wheel having its stem projecting into the forward end of the tubular section of the shaft and secured thereto, said stem being provided with a collar for engaging the end of the casing, a spring in the tubular section of the shaft and having one end secured to the polygonal end of the rear shaft-section and its other end to the stem of the double-gear wheel, and means for sliding one section of the said casing, substantially as described.

2. In a bicycle, the combination with the frame, a pinion on the axle of the rear wheel, and a driving-wheel on the pedal-shaft and having two concentric gears, of a casing secured to the frame and formed of a stationary section and a sliding section, an extensible shaft mounted in the casing, said shaft consisting of a rear section having a polygonal inner end and carrying at its outer end a pinion meshing with the pinion on the axle of the rear wheel, and a tubular forward section fitting on the polygonal inner end of the rear section and carrying at its forward end a double-gear wheel meshing with either gear of the driving-wheel, and a stop with which the forward end of the sliding casing is adapted to engage, a spring connecting the sections of the shaft, and means for moving the sliding section of the casing substantially as described.

3. In a bicycle, the combination with a telescoping casing, and an extensible shaft mounted in the casing and formed of sliding and spring-actuated sections, each section carrying a gear-wheel at its end, of a casing, a shaft in the casing, a chain or the like having one end secured to the shaft and the other to one section of the casing, a second shaft in the casing and geared with the first-named shaft, said second shaft being provided with a crank-handle at one end, a spring-pressed pawl in the casing and engaging a gear-wheel to prevent backward movement of the same, and means for manipulating the pawl from the outside of the casing, substantially as described.

4. In a bicycle, the combination with a pinion, the axle on the rear wheel, a driving-wheel having a hub-gear and a peripheral gear, a telescoping casing, and an extensible shaft in the casing and formed of sliding and spring-actuated sections, one section carrying a pinion and the other a double-gear wheel, of a casing, a shaft mounted in the casing and provided with a gear-wheel and a drum, a chain having one end secured to the drum and the other end to one of the casing-sections, a second shaft provided with a pinion meshing with the gear-wheel of the first-named shaft and with a crank-handle at its end, a spindle provided with a handle for manipulating it, a pawl on the spindle and engaging the pinion of the second shaft, and a spring surrounding the spindle and having one end secured to the casing and its other end engaging the pawl, substantially as described.

ANDREW C. NYGAARD.

Witnesses:
E. A. DURANT,
JAS. M. RUMSEY.